(No Model.)
W. S. RABB.
Farm and Garden Tool.
No. 233,019.  Patented Oct. 5, 1880.
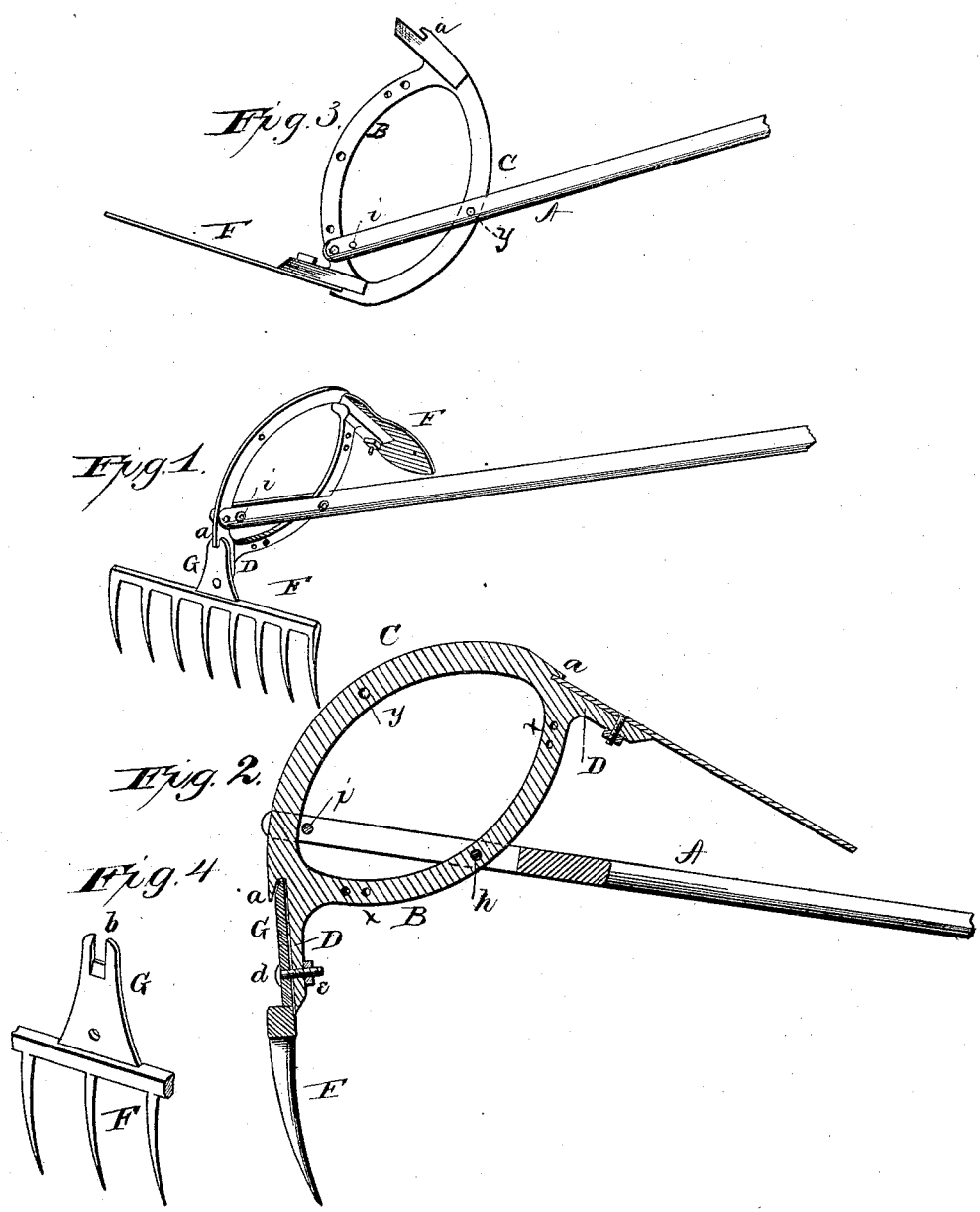
Witnesses:
Franck L. Durand
H Aubrey Toulmin
Inventor:
Wm S. Rabb
By Alexander & Mason
Attys

UNITED STATES PATENT OFFICE.

WILLIAM S. RABB, OF WINNSBOROUGH, SOUTH CAROLINA.

FARM AND GARDEN TOOL.

SPECIFICATION forming part of Letters Patent No. 233,019, dated October 5, 1880.

Application filed March 10, 1880. (No model.)

*To all whom it may concern:*

Be it known that I, WILLIAM S. RABB, of Winnsborough, in the county of Fairfield, and in the State of South Carolina, have invented certain new and useful Improvements in Farm and Garden Tools; and I do hereby declare that the following is a full, clear, and exact description thereof, reference being had to the accompanying drawings, and to the letters of reference marked thereon, making a part of this specification.

The nature of my invention consists in the construction and arrangement of a farm and garden tool, as will be hereinafter more fully set forth, and pointed out in the claims.

In the annexed drawings, to which reference is made, and which fully illustrate my invention, Figure 1 is a perspective view of my invention. Fig. 2 is an enlarged section of the same. Fig. 3 is a side view, showing the head reversed. Fig. 4 is a detailed view of one of the tools detached from the head.

A represents the handle of my improved farm and garden tool. This handle has its end slotted longitudinally for a suitable distance, and in this slot is pivoted the head to which the tools are or may be secured. This head, as shown, is composed of two curved bars, B and C, made on suitable circles and connected at their ends; but it is evident that a solid plate may be used, if desired, instead of the circle-bars, though I prefer said bars, because the head can then be made very light, while at the same time it is sufficiently strong and durable.

At each end of the head—that is, at the connections of the bars B C—is formed an arm, D, extending at an angle, as shown, and at the upper or inner end of this arm is an overhanging beveled lip, a.

F F represent the tools proper, which are shown as being a hoe-blade and a rake; but I do not confine myself to these two tools or implements alone, nor to any particular size of the tools, as it is, of course, evident that any farm or garden implement, and of any shape or size, may be used in connection with the head B C.

Each tool or implement F is formed or provided with a flat shank, G, which has in its extreme end a slot or notch, b, which admits of the shank passing up under the lip a and fitting on both sides. A bolt, d, is then passed through the shank and through the arm D, and a nut, e, screwed on the end of the bolt, which firmly and securely holds the tool in its place. The notch b and lip a effectually prevent any side movement of the tool or implement, while the bolt, of course, prevents any up-and-down movement. The bar B of the head is the farthest down in the slot of the handle A; Fig. 2, and a bolt, h, passing through the center of said bar, pivots the head in the handle. Another bolt, i, is passed through the handle close to the inner edge of the outer curved bar, C, and said bolt is tightened sufficiently to obtain the necessary amount of friction on the bar C by the extreme end of the slotted handle.

Supposing, for instance, that a hoe-blade is attached to one end of the head and a rake to the other, the operator can in an instant turn the head on its pivot h, reversing the same, and thus use either the one or the other tool, as he may desire. This is of great importance, as it is very often necessary to change tools, maybe, for a minute or so; and with my invention the operator always has two tools on the handle, and by simply reversing the head he can use either one of the two, whereas under ordinary circumstances he would have to lay one down and pick up another, besides the trouble of carrying them about with him.

The head B C is also capable of another use in the following manner: In the bar B of the head, near each end, are made one, two, or more holes, x, at any desired distances apart, and in the bar C is a center hole, y. By removing the pivoting-bolt h, and turning the head over, so that the bar C will be down near the inner end of the slot in the handle, and then passing the bolt h through the hole y in said bar C, and then taking out the bolt i and inserting the same through proper holes in the extreme end of the slotted handle and through either of the holes x in the bar B, the head becomes rigidly fastened in the handle, and a shovel, spade, dung-fork, or similar implement may be attached to the head and used in the ordinary manner.

The object of having one or more holes $x$ is to allow the operator to adjust the head at different angles, as he may deem most serviceable.

Wherever I use the term "bolts" it must be understood that screws can equally as well be used, the threads being then formed in the different parts, instead of having extra nuts to be screwed on the ends of the bolts.

Having thus fully described my invention, what I claim as new, and desire to secure by Letters Patent, is—

1. In a farm or garden implement, a head consisting of two circle-bars, B C, having an arm, D, at each end to receive a removable tool, said head being pivoted in the slotted handle A and capable of being turned on its pivot as well as turned upside down in the handle, substantially as herein set forth.

2. In a farm or garden implement, the head consisting of the two circle-bars B C, having an arm, D, at each end, in combination with a removable tool attached to each arm and a slotted handle in which the head is pivoted, substantially as herein set forth.

3. In a farm or garden implement, a reversible head, B C, carrying a removable tool at each end and pivoted in a slotted handle, A, the prongs of said handle being held by a bolt to the head with sufficient power to prevent slipping, substantially as herein set forth.

4. The combination of the slotted handle A, head B C, having the perforations, as described, and the bolts $h$ $i$, substantially as and for the purposes herein set forth.

In testimony that I claim the foregoing I have hereunto set my hand this 6th day of March, 1880.

WILLIAM SMITH RABB.

Witnesses:
T. R. ROBERTSON,
O. W. BUCHANAN.